Dec. 13, 1966  J. ERNST  3,290,876
ENGINE EXHAUST GAS DECONTAMINATING DEVICE
Filed Feb. 3, 1965  2 Sheets-Sheet 1
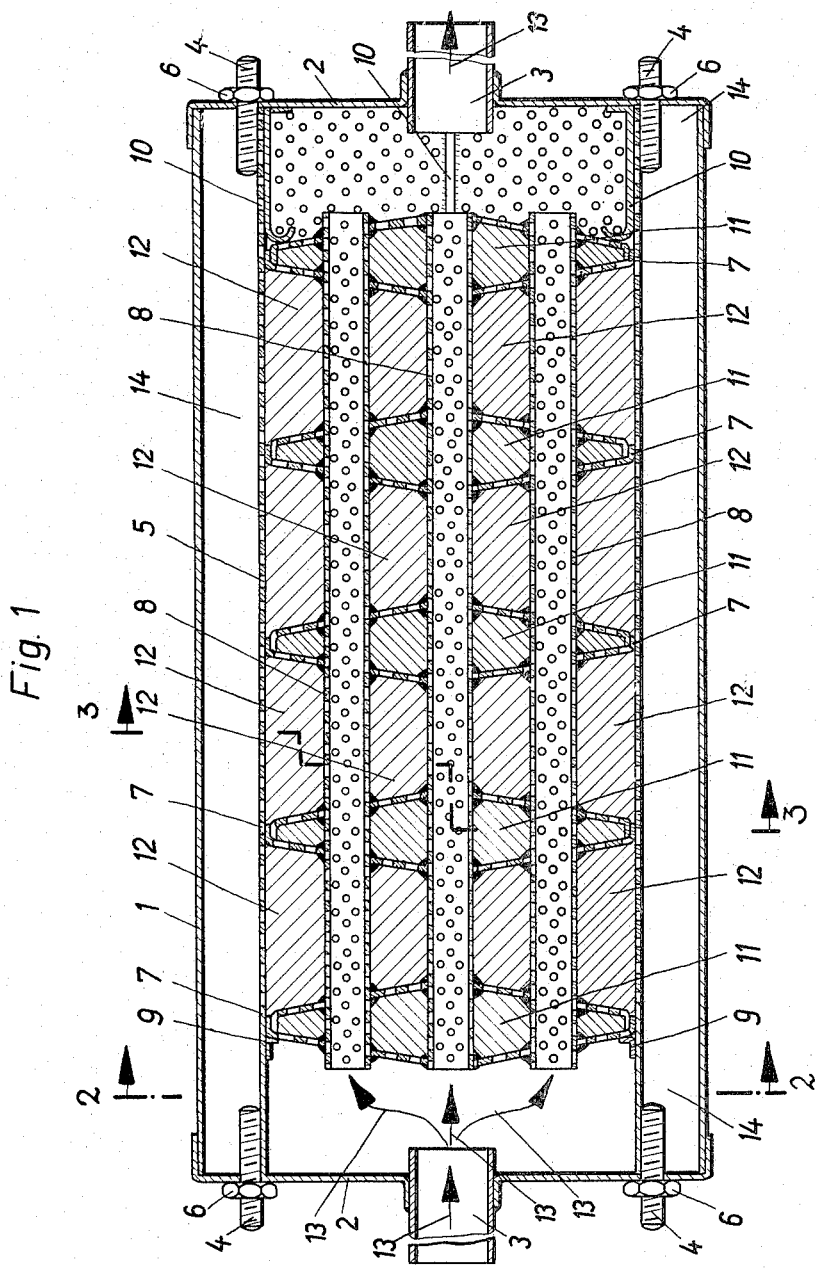
Inventor:
Josef Ernst
By: Spencer & Kaye
Attorneys Dec. 13, 1966    J. ERNST    3,290,876
ENGINE EXHAUST GAS DECONTAMINATING DEVICE
Filed Feb. 3, 1965    2 Sheets-Sheet 2
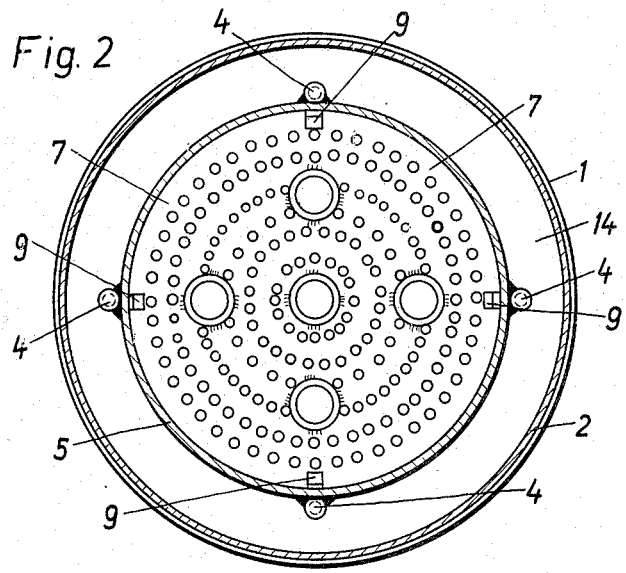
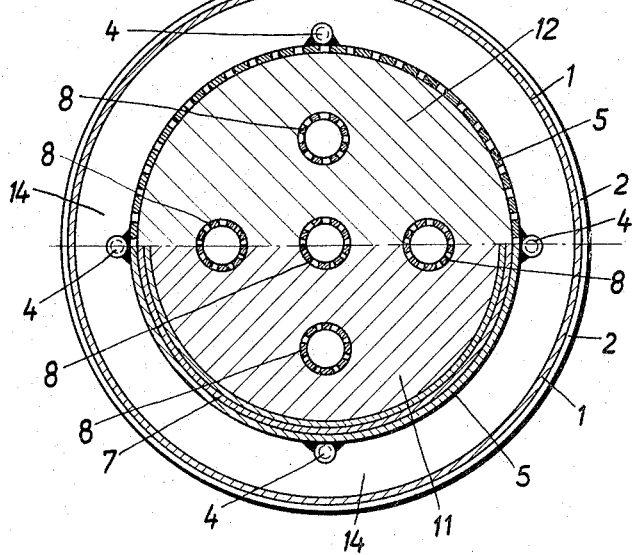
Inventor:
Josef Ernst
By: Spencer & Kaye
Attorneys

United States Patent Office 3,290,876
Patented Dec. 13, 1966

3,290,876
ENGINE EXHAUST GAS DECONTAMINATING DEVICE
Josef Ernst, Hardenbergstrasse 14, Hagen, Germany
Filed Feb. 3, 1965, Ser. No. 430,155
Claims priority, application Germany, Nov. 17, 1964, E 28,149
7 Claims. (Cl. 60—29)

The present invention relates to a decontamination device, and more particularly, to a device for removing undesirable constituents from the exhaust gases of internal combustion engines, such as automobile engines.

Heretofore, numerous suggestions for decontaminating the exhaust gases of automobile engines have been made, the aim of which is to reduce the atmospheric concentration of that group of substances present in the exhaust gases which are harmful and bothersome above a certain concentration. In addition to decreasing the concentration of hygienically harmless substances, it is especially important to lower the relatively high concentration of carbon monoxide which is present in exhaust gases discharged into the atmosphere, particularly in the case of Otto-cycle carburetor engines.

Known devices for decontaminating exhaust gases, such as afterburners, which re-burn the exhaust gases, require a substantial expenditure for apparatus. Also, there are substantial costs connected with replacing various known devices which have lifetimes shorter than that of an automobile.

Moreover, all such known devices have the common drawback that the decontamination provided is insufficient.

It is therefore an object of the present invention to provide a device for decontaminating exhaust gases from an internal combustion engine which is free of the above-mentioned drawbacks.

It is a further object of the present invention to provide a device for decontaminating exhaust gases from an internal combustion engine which utilizes metallic pentoxide and activated charcoal as decontaminating agents.

To accomplish these objects and others, a decontaminating device is provided according to the invention wherein first and second pluralities of chambers are sequentially arranged in the engine exhaust conduit and are interspaced with one another so that a chamber from the first plurality is followed by one from the second plurality, followed by one from the first plurality, and so on; these chambers have perforated walls, and the first plurality thereof contain granulated metallic pentoxide, while the second plurality contain granulated, activated charcoal. They are contained in a cylindrical housing having coupling means at the inlet and outlet ends for coupling the device into the engine exhaust conduit at a point close enough to the engine to provide an internal temperature in the device of above about 100° centigrade. A plurality of perforated channels intercommunicate the first and second pluralities of chambers, and the ends of these channels provide communication between the inlet and outlet coupling means.

Additional objects and advantages of the present invention will become apparent upon consideration of the following description when taken in conjunction with the accompanying drawings in which:

FIGURE 1 is a longitudinal sectional view showing a device for decontaminating the exhaust gases from an Otto-cycle carburetor engine.

FIGURE 2 is a sectional view taken along line 2—2 of FIGURE 1.

FIGURE 3 is a sectional view taken along line 3—3 of FIGURE 1.

In this embodiment, as shown in the drawings, the ends of a cylindrical housing 1 are closed off by end caps 2, each of which is provided with a connecting pipe 3 for coupling the device into the exhaust pipe. The device is installed sufficiently close to the engine to guarantee an operating temperature of at least 100° centigrade within the housing. Screws 4 extend through the end caps 2, and are welded to a shell 5 within the housing. By means of these screws, in conjunction with nuts 6, the end caps 2 are detachably braced against the ends of the housing 1 and shell 5. Five capsules 7, made of perforated sheet metal, are provided within shell 5, all of which are penetrated by five channels 8 extending longitudinally within the device. The channels are formed by perforated tubes. The capsules 7 and the channels 8 are permanently joined together, and are detachably inserted in the shell.

Under certain circumstances, it is advantageous to construct the capsules so that they can be conveniently opened and closed. For mounting the capsules and channels in the shell 5, they are braced on the one hand, by rigid brackets 9 fastened to shell 5, and, on the other hand, by resilient spacer elements 10. The latter are riveted to end cap 2, at the right sides of the device. The capsules 7, which are filled with granulated vanadium pentoxide 11, and the channels 8 divide the shell 5 into chambers which contain granulated activated charcoal 12. Furthermore, the shell 5 is perforated after the first capsule, in the direction of flow of the exhaust gases (indicated by arrows 13) and forms an annular space 14 in conjunction with the housing 1.

The mode of operation of the device is as follows:

When exhaust gases of an automobile engine flow into the device through the left-hand connecting pipe 3, the gas flow is divided into partial streams in channels 8, which reunite after passing through these channels to discharge through the right-hand connecting pipe 3. The gases may flow, for example into a muffler (not shown). During this process, the interruptions in the conduit walls induce turbulence in the gas flow, causing greater contact between it, on the one hand, and the vanadium pentoxide and activated charcoal on the other. The carbon monoxide present in the exhaust gases is oxidized by reduction of the heated pentoxide, forming carbon dioxide. Likewise, however, harmful or bothersome carbon gases are adsorbed by the activated charcoal 12. At the same time, the activated charcoal 12 acts as a muffler, and the annular space 14 provides most effective sound insulation because of the gases dammed up therein. By increasing the number of channels 8, the efficiency of the device can be further increased. When used in automobiles, the device is fully effective for about 30,000 miles.

As has thus been demonstrated, the solution to the problem mentioned in the introduction has been found to lie in providing granulated, metallic pentoxide as an oxidizing agent for the carbon monoxide contained in the exhaust gases, and providing granulated activated charcoal as an adsorbing agent for a number of other harmful or bothersome gases which are exhaust components. These agents are provided in the exhaust pipe at a point such that the temperature thereat is at least 100° centigrade.

It has further been seen that the invention if characterized by the use of vanadium pentoxide in connection with the above-described arrangement.

An advantageous embodiment of the invention has been seen to lie in providing the vanadium pentoxide and the activated charcoal in chambers separated from one another and having perforated walls, in such a manner that the agents alternate with one another and are located one behind the other in the direction of flow of the exhaust gases. Furthermore, the chambers are encompassed by a suitable cylindrical housing, provided at its end with connecting pipes for coupling the device into the exhaust pipe. The chambers are penetrated by several channels having perforated walls, which extend substantially along the longitudinal extension of the connecting pipes. The latter are arranged coaxially with respect to each other, and the channels are open towards and in communication with the connecting pipes. Preferably, furthermore, the connecting pipes have identical cross-sectional areas of flow, and the sum of the cross-sectional flow areas of the channels preferably corresponds to the cross-sectional flow area of one connecting pipe.

By carrying out the above provisions, as has been shown, an inexpensive device for decontaminating the exhaust gases of automobile engines has been provided which, as experience has proven, almost completely converts or adsorbs the undesirable constituents of the exhaust gas. It performs this function over the entire speed range of the engine. In addition, the activated charcoal provided according to the invention acts as a muffler, especially for low frequencies, so that only a relatively simple muffler, mainly for damping high sonic frequencies, is additionally necessary. Furthermore, when a device constructed according to the invention is installed in the exhaust pipe of an internal combustion engine, there is no perceptible decrease in efficiency of the engine, because the exhaust gases can flow through the device in almost a straight line. Also, the device has relatively small structural dimensions, so that it can be installed without difficulty in existing automobiles.

As has also been demonstrated, an advantageous feature of the above-disclosed embodiment, which makes highly economical manufacture of the device possible, lies in that the chambers which contain the vanadium pentoxide and the activated charcoal are formed of capsules provided one behind the other and spaced from one another, which capsules have perforated walls, and of a shell encompassing the capsules and extending up to the end faces of the housing; furthermore, the channel walls are carried by the capsules.

A further feature of the above-described device lies in that the shell is spaced radially from the housing, and is perforated between the first capsule at the inlet end and the outlet end.

In this manner, a gas cushion is formed from exhaust gases dammed up between the shell and the housing, which cushion has a muffling effect.

A further advantageous feature of the above-mentioned device has been shown to lie in that the shell, the capsules, and the channels are formed into a single unit, which is mounted in the housing so as to be easily replaceable.

In this connection, it has been seen that a preferred embodiment is characterized by making the capsules and the channels as an integral structural unit, which is detachably held in the shell. The channels are formed by perforated tubes. Moreover, the shell is provided with connecting elements, such as screws, extending through the end faces of the housing. These end faces of the housing are preferably made as caps (as shown in FIGURE 1) and can be braced tightly against the ends of the shell and the housing by means of screws which are screwed down on the nuts, as shown in FIGURE 1.

In this manner, it is possible to exchange quickly and conveniently only the vanadium pentoxide and the activated charcoal if and when required.

It will be understood that the above description of the present invention is susceptible to various modifications, changes and adaptations, and the same are intended to be comprehended within the meaning and range of equivalents of the appended claims.

What is claimed is:

1. An arrangement for decontaminating the exhaust gases of an internal combustion engine, said arrangement comprising: means forming first and second pluralities of chambers sequentially arranged in said exhaust conduit, the first plurality of chambers containing metallic pentoxide and the second plurality of chambers containing activated charcoal, said first and second pluralities of chambers being inter spaced with each other so that a chamber from the first plurality is followed by the chamber of the second plurality which is followed by a chamber from the first plurality, and so on, said chambers having perforated walls; means forming a cylindrical housing about said first and second pluralities of chambers and having coupling means at its inlet and outlet ends for connection in the engine exhaust conduit; a plurality of perforated channels arranged axially in said housing for intercommunicating said first and second pluralities of chambers, said perforated channels communicating at their respective ends with said inlet and outlet coupling means to provide a continuous exhaust path through the arrangement, the exhaust gases entering said arrangement being at a temperature of at least about 100° C.

2. An arrangement as defined in claim 1, wherein said metallic pentoxide is vanadium pentoxide.

3. An arrangement as defined in claim 1, wherein said inlet and outlet coupling means have the same cross-sectional flow area, said cross-sectional flow area being equal to the sum of the cross-sectional flow areas of said perforated channels.

4. An arrangement as defined in claim 1, wherein said means forming first and second pluralities of chambers include a series of capsules spaced from one another, arranged axially within the cylindrical housing and having perforated walls; a cylindrical shell encompassing said spaced capsules so that the spaces therebetween form said second plurality of chambers, said shell extending to the ends of the cylindrical housing, and said capsules constituting means for supporting said perforated channels.

5. An arrangement as defined in claim 4, wherein said shell is radially spaced from said housing and is perforated along its extension between the first capsule at the inlet end and the outlet end.

6. An arrangement as defined in claim 5, wherein said shell, the capsules, and the channels form a complete unit, said unit being removably mounted in said housing.

7. An arrangement as defined in claim 5, wherein said channels are formed of perforated pipes, and said capsules and the channels are permanently connected together to form a unit, said shell being removably fastened to said unit; connecting means for connecting the shell to the housing, said connecting means including screws extending axially from the ends of said shell through the respective coupling means at the inlet and outlet ends of said housing, and a plurality of nuts co-operating with said screws to hold said inlet and outlet coupling means tightly braced against the shell and said housing.

References Cited by the Examiner
UNITED STATES PATENTS

| | | | |
|---|---|---|---|
| 1,595,711 | 8/1926 | Cornelier. | |
| 2,077,563 | 4/1937 | Henry | 60—29 X |
| 3,090,677 | 5/1963 | Scheitlin | 60—29 X |
| 3,215,507 | 11/1965 | Horstman | 23—288.3 |

MARK NEWMAN, Primary Examiner.

RALPH D. BLAKESLEE, Examiner.